United States Patent [19]

Maruyama et al.

[11] Patent Number: 4,772,841

[45] Date of Patent: Sep. 20, 1988

[54] STEPPING MOTOR AND DRIVING METHOD THEREOF

[75] Inventors: Toshiki Maruyama; Hiroshi Nakagawa; Minoru Maeda, all of Mie, Japan

[73] Assignee: Shinko Electric Co., Ltd., Tokyo, Japan

[21] Appl. No.: 11,914

[22] Filed: Feb. 5, 1987

[30] Foreign Application Priority Data

Mar. 8, 1986 [JP] Japan ................. 61-050780
Jun. 17, 1986 [JP] Japan ................. 61-140867
Jul. 23, 1986 [JP] Japan ................. 61-172992

[51] Int. Cl.[4] .............................. H02P 8/03
[52] U.S. Cl. .................... 318/696; 318/685;
318/135; 354/234.1; 148/315; 148/442;
335/153
[58] Field of Search ............. 318/696, 685, 135;
354/234.1; 148/315, 442; 335/153

[56] References Cited

U.S. PATENT DOCUMENTS

| | | | |
|---|---|---|---|
| 3,974,000 | 8/1976 | Henmi et al. | 148/442 |
| 4,028,144 | 6/1977 | Tomishima et al. | 148/315 |
| 4,099,192 | 7/1978 | Aizawa et al. | 354/234.1 |
| 4,221,163 | 9/1980 | Anderson | 335/153 X |
| 4,490,663 | 12/1984 | Kamiyama et al. | 318/696 |
| 4,549,126 | 10/1985 | Tanimoto et al. | 318/696 |
| 4,578,622 | 3/1986 | Nakagawa et al. | 318/135 |
| 4,594,520 | 6/1986 | Miwa et al. | 318/135 X |
| 4,661,755 | 4/1987 | Suzuki et al. | 318/696 |

Primary Examiner—William M. Shoop, Jr.
Assistant Examiner—M. Bergmann
Attorney, Agent, or Firm—Wenderoth, Lind & Ponack

[57] ABSTRACT

A stepping motor includes a primary side magnetic flux generator unit having a plurality of magnetic poles and a secondary side magnetic member provided rotatably in the primary side magnetic flux generator, characterized in the primary side magnetic flux generator unit generating a magnetic flux passing through a magnetic flux path formed by at least two of the magnetic poles and the secondary side magnetic member to produce an attraction force between the magnetic poles and the secondary side magnetic members for thereby moving one of the primary side magnetic flux generator unit and the secondary side magnetic member, the magnetic poles having coils respectively provided therebetween and having a semihard magnetic member provided over tip ends thereof forming a magnetic flux path among a plurality of the magnetic poles, the semihard magnetic member being magnetized by a magnetic flux produced in the magnetic flux path every time the magnetic flux is produced, the semihard magnetic member producing a magnetic flux directed in the opposite direction to that of a residual magnetic flux formed between each of the magnetic poles and a secondary side magnetic member when the primary side magnetic flux generator means stops the generation of the magnetic flux, thereby cancelling the residual magnetic flux.

12 Claims, 14 Drawing Sheets

STEPPING MOTOR AND DRIVING METHOD THEREOF

BACKGROUND OF THE INVENTION

1. Field of the Invention

The present invention relates to stepping motors such as rotary stepping motors and linear stepping motors, and more particularly to driving method thereof wherein stop positioning accuracy is improved.

2. Description of the Prior Art

Stepping motors such as linear stepping motors, rotary stepping motors, etc., are adapted in general to move a primary side magnetic flux generating unit or a secondary side magnetic member by making use of a pulse current supplied to the primary side magnetic flux generating unit, and are capable of precisely controlling the amount of movement thereof (or the amount of rotation thereof). They have therefore been profitably employed for various kinds of precision apparatuses. These motors, however, suffer from some problems. Namely, the accuracy of stopping a movable member of a stepping motor is particularly severe in various applications. In the following discussion, the general arrangement of a stepping motor will first be described, prior to the discussion of these problems.

Referring hereto FIG. 16, illustrating a linear stepping motor as an exemplary prior art stepping motor, the numeral 1 is a secondary side scale (secondary side magnetic member) and the numeral 2 is a movable member (primary side magnetic flux generating unit) placed on the secondary side scale 1.

The secondary side scale 1 described above has a comb-shaped tooth part 1a formed on the upper surface thereof in a prescribed pitch (distance between the centers of teeth adjacent to each other) and guide rails 1b are respectively mounted on both sides of the scale 1.

The movable member 2 described above consists of iron cores 3 and 4 and side plates 5 and 6 for fixing widthwise the iron cores 3 and 4, and magnets 7 and 8 fixedly mounted on the upper parts of the iron cores 3 and 4 and coils 9a, 9b, 9c, and 9d, respectively mounted on respective magnetic poles 3a, 3b, 4a, and 4b of the iron cores 3 and 4 and shafts 10 and 11 mounted on the lower ends of the side plates 5 and 6, and bearings 12 . . . mounted on both ends of these shafts 10 and 11.

Pole teeth 13a, 13b, 14a, 14b are respectively formed on the lower ends of the magnetic poles 3a, 3b, 4a, 4b in the same pitch as that of the tooth part 1a. These pole teeth 13a, 13b, 14a, 14b are opposed to the tooth part 1a of the scale 1 respectively differing by ¼ pitch from each other. For example, when the pole tooth 14b agrees with the tooth part 1a, the pole tooth 13a is displaced to the right side in the Figure by ¼ pitch with respect to be tooth part 1a, and likewise the pole tooth 14a is displaced by 2/4 pitch and the pole tooth 13b is displaced by ¾ pitch.

Next, the operation of this linear stepping motor will be described with reference to FIG. 17. In the figure, the arrow M shows a magnetic flux from the magnets 7 and 8.

The figure shows a state of the linear stepping motor wherein pulse current conduction to the coils 9a and 9a is finished (a magnetic flux is produced in the direction of the arrow P), and a pulse current is conducted through the coils 9c and 9d to generate a magnetic flux shown by the arrow Q. In this situation, the magnetic flux Q is directed in the opposite direction to that of the magnetic flux M from the magnets 7 and 8 on the magnetic pole 4a side to cancel magnetic force of the latter, while it is directed in the same direction as that of the magnetic flux M on the magnetic pole 4b side to enhance the latter. Thus, an attraction force is produced between the tooth part 1a of the scale 1 and the pole tooth 14b of the magnetic pole 4b displaced to the right by ¼ pitch with respect to the tooth part 1a to, whereby the entire movable member 2 is advanced by ¼ pitch in the F direction (the figure illustrates a state of the movable member after the movement thereof).

Next, by conducting a pulse current through the coils 9a and 9b after stopping the current conduction to the coils 9c and 9d to generate a magnetic flux in the opposite direction to that of the arrow P, this magnetic flux allows its magnetic force to cancel that of the magnetic flux M on the magnetic pole 3b side while allowing the same magnetic force to enhance the latter magnetic force on the magnetic pole 3a side. Thus, an attraction force is produced between the pole tooth 13a of the magnetic pole 3a and the tooth part 1a of the scale 1 to permit the movable member 2 to again advance in the F direction by ¼ pitch.

The movable member 2 can be driven to an arbitrary position and stopped at that position by properly altering the direction of the current flow supplied to the respective coils 9a to 9d, and the order thereof in the same manner as the above procedure.

Furthermore, substantially the same principle as in the above linear stepping motor can also be applied to a rotary type stepping motor, and hence the description thereof will be omitted for the sake of brevity.

Such a prior art stepping motor encounters the following problems upon effecting accurate positioning control.

This problem will be described with reference to FIG. 17 again. This figure illustrates as described previously the state of the motor wherein after the pulse conduction to the coils 9a, 9b (the magnetic flux P is generated) is finished, a pulse current is conducted through the coils 9c and 9d to generate a magnetic flux Q.

The magnetic flux P ought to completely disappear in essence in the above situation since the current conduction to the coils 9a and 9b has already been finished. However, the corresponding portions of the iron core 3 and the scale 1 are slightly magnetized by the magnetic flux P generated by the coils 9a and 9b, and hence a weak magnetic flux is left behind as shown by the chain line in the figure (residual magnetic flux). This residual magnetic flux cancels the magnetic flux M on the magnetic pole 13a side while strengthening the magnetic flux M on the magnetic pole 13b side, whereby it produces an attraction force between the pole tooth 13b of the magnetic pole 3b and the tooth part 1a of the scale 1. This attraction force finally acts to pull the movable member 2 to the right. Accordingly, when the movable member 2 is contrived to stop at a prescribed position, the movable member 2 is obliged to stop at a position where the pulling attraction force to the left produced between the pole tooth 14b and the tooth part 1a is adapted to balance the above-mentioned pulling attraction force to the right. Thus, the stop position of the movable member is shifted as shown by H in the figure. A hysteresis is defined as changes in the magnetization of a substance logging behind changes in the magnetic field as the magnetic field is varied. Such a hysteresis is produced at all times when the movable member 2 stops to result in the inaccurate stop positioning of the movable member 2. Such a problem of hysteresis is also encountered by other types of stepping motors.

Furthermore, it is also possible to eliminate such hysteresis by forming the iron cores 3 and 4 with a high-quality magnetic member and magnetically anneal them with scrupulous care, but this method is very costly and, even if executed, can not prevent such a residual magnetic flux from being produced to some degree.

Next another problem encountered by such a motor will be described.

FIG. 18(a) is a schematic illustrating the arrangement of a prior linear stepping motor. As shown in the figure, a movable member I' consists of exciting coils A' and B', cores C' and D', and a permanent magnet E. Symbols P1 to P4 denote magnetic poles. K' is a stator having teeth 1', 2' . . . formed in an equal pitch on the upper surface thereof. FIG. 19 is a block diagram of a driving circuit for driving the coils A' and B' described above. In the figure, elements 1a', 1b', 2a', 2b', 3a', 3b', 4a', and 4b' are respective transistors.

When moving the movable member 1' in the direction of the arrow Y1' of FIG. 18 in the linear pulse motor arranged as such, the transistors 1a', 1b' . . . are driven in the following order:

1a', 1b'→3a', 3b'→2a', 2b'→4a', 4b'→1a', 1b'→ . . . .

When the transistors 1a' and 1b' are switched on, a current is forced to flow through the coil A' in the direction of A1'→A2' whereby the movable member I' is moved in the direction of the arrow Y1' and is stopped while allowing the magnetic pole P1' to face a tooth 1' for example, as shown FIG. 18(a). When in the transistors 1a' and 1b' are switched off and the transistors 3a' and 3b' are being switched on, a current is conducted in the direction of from B1' to B2' through the coil B', whereby the movable member I' is further moved in the direction of the arrow Y1' by ¼ pitch and stopped with its state where the magnetic pole P2' faces to the tooth 4' as shown in FIG. 18(b). The same operation will thereafter be repeated.

Furthermore, when the movable member I' is moved in the direction of the arrow Y2, the transistors 1a and 1b are driven in the following order:

4a', 4b'→2a', 2b'→3a', 3b'→1a', 1b'→4a', 4b'→ . . . .

An application of such a linear stepping motor, for example, to drive a magnetic head of a floppy disk drive, requires a positioning accuracy on the order of a micrometer. However, a prior linear stepping motor of the type described above produces a hysteresis phenomenon because of the cores C' and D' having the residual magnetism, in which the movable member I', as subjected to reciprocation, is obliged to stop at different positions when it goes ahead and back.

In the following, the hysteresis will be described with reference to FIG. 21. As shown in the figure, the movable member I', when, for example, moving from a state shown in FIG. 18(a) to one shown in FIG. 18(b), does actually not stop in the latter state, but stops displaced by $\Delta x'$ in the Y2' direction as shown in FIG. 21. The reason is that first in single phase excitation, the core C' is obliged to have a residual magnetism $\phi r'$ (FIG. 21) even when the current conduction through the coil A' is cut off, and the residual magnetism $\phi r'$ produces an unbalance between thrust force caused by the magnetic pole P1' and that by the magnetic pole P3', the unbalance then causes the movable member I' to be subjected to a force in the arrow Y2' direction. Likewise, when the movable member I' moves in the arrow Y2' direction, it stops displaced by $\Delta x'$ shown in the same figure in the arrow Y1' direction. Namely, it has its different stop positions which depend on the direction of movement prior to stopping. In addition, in two phase excitation, residual magnetism $\phi r'$ remains when the current flowing through the coil A' is reversed; the residual flux $\phi r'$ by reacting with the reversed current through coil A' provides a back magnetomotive force which acts against the formed going magnetomotive force after the current inversion so as to cause unbalanced thrust forces. Prior linear stepping motors encounter the displacement $2\Delta x'$ of several $\mu$m due to the hysteresis of several micrometers, and hence suffer from accuracy when highly accurate positioning is desired as in cases wherein in particular a magnetic head in a floppy disk drive is driven.

Furthermore, a magnetic material reduced in residual magnetism may be employed for the cores C' and D' in order to remove the hysteresis described above, but the material is very expensive and is incapable of completely eliminating such hysteresis. Moreover, it may also be considered to magnetically anneal the cores C' and D', but its execution requires much labor.

SUMMARY OF THE INVENTION

In view of the drawbacks of the prior techniques, it is an object of the present invention to provide a stepping motor and a method of driving such a motor capable of accurate positioning control with a simple structure.

Another object of the present invention is to provide a stepping motor and a method of driving such a motor capable of substantially eliminating the hysteresis described above without modification of a motor structure.

To achieve the above objects, a stepping motor comprises a primary side magnetic flux generator unit having a plurality of magnetic poles, and a secondary side magnetic member provided rotatably in the primary side magnetic flux generator, characterized in that the primary side magnetic flux generator unit generates a magnetic flux passing through a magnetic flux path formed by at least two plurality of magnetic poles and the secondary side magnetic member to produce a attraction force between the magnetic poles and the secondary side magnetic member to impart a relative movement between the primary side magnetic flux generator unit and the secondary side magnetic member, the magnetic poles have coils respectively provided therebetween and have a semihard magnetic member provided over tip ends thereof so as to form a magnetic flux path among a plurality of the magnetic poles. The semihard magnetic member is magnetized by a magnetic flux produced in the magnetic flux path every time the magnetic flux is produced and the semihard magnetic member produces a magnetic flux directed in the opposite direction to that of a residual magnetic flux formed between each of the magnetic poles and a secondary side magnetic member when the primary side magnetic flux generator means stops the generation of the magnetic flux, thereby cancelling the residual magnetic flux. The semihard magnetic member is bonded to end surfaces of coils wound around iron cores so as to make close contact with the side surfaces of the tip end parts of the magnetic poles. The semihard magnetic member comprises a material such as various types of hysteresis materials and semihard magnetic materials, high-carbon steel materials, SK material, magnetic stainless, and tungsten steel.

To further achieve the above objects, a method of driving a stepping motor according to the present invention comprises the steps of:

(a) providing a semihard magnetic member over tip end portions of magnetic poles forming the same magnetic flux path among a plurality of said magnetic poles of primary side magnetic flux generator means;

(b) magnetizing the semihard magnetic member by a magnetic flux produced in the magnetic flux path every time the magnetic flux is produced; and (c) permitting the semihard magnetic member to produce a magnetic flux directed in the opposite direction to that of a residual magnetic flux formed between each of said magnetic poles and a secondary side magnetic member when said primary side magnetic flux generator means stops the generation of the magnetic flux, thereby cancelling said residual magnetic flux.

A stepping motor according to the invention may also comprise a stator, a movable member, a plurality of main coils wound around the stator for relatively moving the stator and the movable member by allowing the main coils to be excited in succession, and auxiliary coils provided in the vicinity of the respective main coils, the auxiliary coil being excited after the main coils have been excited so as to generate a magnetic flux oppositely to a magnetic flux produced by the main coils. The motor further include a driving circuit for exciting the auxiliary coil comprising a power source means for supplying power to the driving circuit, main coils for moving the movable member, auxiliary coils connected to the main coils for cancelling out magnetic fluxes produced by the main coils, first transistors connected between the power source and the main coils for driving the main coils, second transistors for driving the auxiliary coils, and switches connected between the main coil and the auxiliary coil for switching the directions of the currents each flowing through the auxiliary coils, thereby changing the moving direction of the movable member.

In addition, a method of driving a stepping motor according to the present invention may comprise the steps of:

(a) providing auxiliary coils in the close vicinity of a plurality of main coils of the pulse motor, and (b) exciting said auxiliary coils so as to permit a magnetic flux to be produced in the opposite direction to that of a magnetic flux generated by said main coils.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

In the following, respective embodiments of driving methods of a stepping motor according to the present invention will be described with reference to the accompanying drawings.

Figure 1:
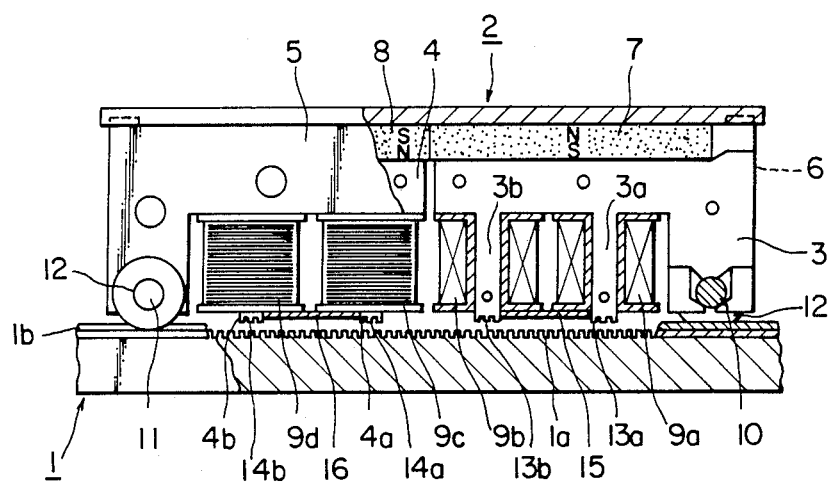
FIG. 1 is a side view partly fractured illustrating a first embodiment of a linear stepping motor and a method of driving a linear stepping motor according to the present invention.

FIG. 1 is a side view fractured in part illustrating a first embodiment of a driving method of a linear pulse motor according to the present invention. The same symbols shall be applied to the same portions as those of the prior art motors described above, and the description thereof will be omitted.

A plate-shaped semihard magnetic member 15 is provided between the tip ends of respective magnetic poles 3a, 3b, of an iron core 3 (constructing the same magnetic path) so as to make contact with the sides of these tip end parts, and bonded to the end surfaces of respective coils 9a, 9b. In addition, the same semihard magnetic member 16 is provided between the tip ends of respective magnetic poles 4a, 4b (constructing the same magnetic path) of an iron core 4.

These semihard magnetic members 15, 16 have a higher coercive force than either of the iron cores 3, 4 and the scale 1, and are formed of materials having a lower coersive force than that of typical rigid magnetic materials. For these materials, there are considered various types of hysteresis materials including semihard magnetic materials which have been applied to many fields until now, including high-carbon steel slightly reduced in coercive force, SK materials, magnetic stainless, and tungsten steel, etc. The semihard magnetic member 15, 16 are more separated from the tooth part 1a than the lower ends of the pole teeth 13a to 14b of the respective magnetic poles 3a to 4b are.

Operation of these semihard magnetic members 15, 16 will be described with reference to FIGS. 2(a) and 2(b).

Figure 2A:
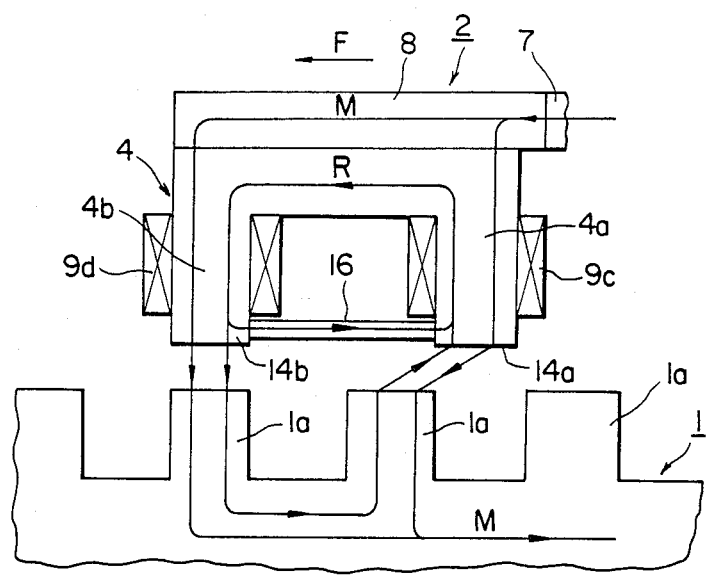
FIGS. 2(a) and 2(b) are schematics illustrating the operation of the linear motor of FIG. 1.
Figure 2B:
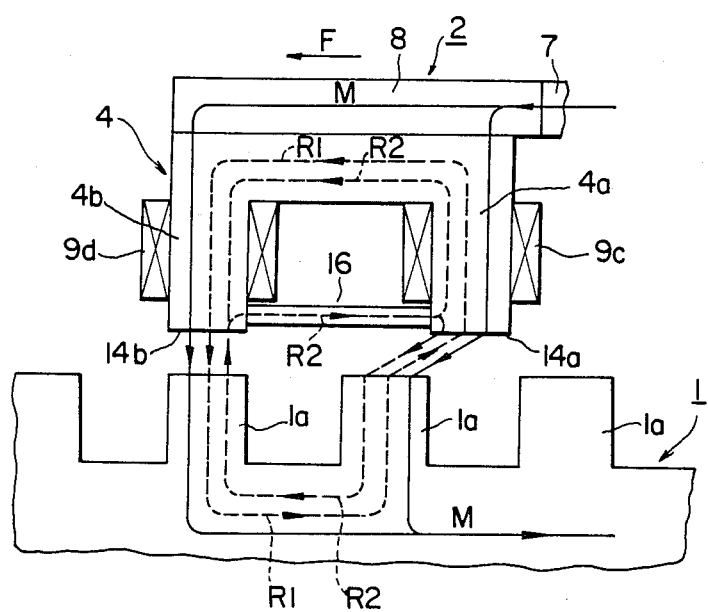

FIG. 2(a) shows a state where a pulse current is allowed to flow through the coils 9c, 9d to generate a magnetic flux R in a magnetic flux path formed by the magnetic poles 4a, 4b and the scale 1.

This magnetic flux R extends in part from the magnetic pole 4b directly to the magnetic pole 4a through the semihard magnetic member 16 to magnetize the semihard magnetic member 16 in the direction shown by the arrow in the same figure. The remaining part of the magnetic flux R passes through the interior of the scale 1 via the tooth part 1a as in prior cases.

The magnetic flux passing through the interior of the scale 1 as such is directed in the same direction as that of the magnetic flux M from the magnets 7, 8 on the side of the magnetic pole 4b, whereby they are enhanced by each other to produce attraction force between the pole tooth 14b of the magnetic pole 4b and the tooth part 1a for thereby permitting the movable member 2 to be moved by ¼ pitch in the direction of the arrow F (the figure shows the state after it is moved).

Next, when the current conduction to the coils 9c, 9d is stopped, a residual magnetic flux R1 is produced in the iron core 4 and the scale 1. The direction of this residual magnetic flux R1 is the same as that of the magnetic flux R produced by the coils 9c, 9d (magnetic pole 4b→scale tooth part 1a→magnetic pole 4a).

On the other hand, the semihard magnetic member 16 has been magnetized and hence has the magnetic flux R2 remaining therein. This is significant since this remaining flux may be used to easily cancel the residual flux, thereby improving the operation of the motor. More particularly, part of the magnetic flux R2 extends in the interior of the iron core 4 in the same direction as that of the residual magnetic flux R1, while the remainder thereof extends through the path: magnetic pole 4a→tooth part 1a→magnetic pole 4b. Namely, the magnetic flux R2 is directed oppositely to the aforementioned residual magnetic flux R1 and thus it serves to cancel the residual magnetic flux R1 between each of the magnetic poles 4a, 4b and the tooth part 1a. Thus, the residual magnetic flux R1 can be completely cancelled out by properly setting the succeptibility and coercive force of the semihard magnetic member 16 so as to thereby make the density of the residual magnetic flux R1 equal to that of the magnetic flux R2 which passes between the magnetic poles 4a, 4b and the scale tooth part 1a.

In addition, the semihard magnetic member 15 also serves as in the above described member 16. As a result, residual magnetic fluxed formed between all the magnetic poles 4a to 4d and the scale 1 can be cancelled out.

According to the linear pulse motor arranged as described above, the residual magnetic fluxes formed between the magnetic poles and scale 1 can be cancelled out by the magnetic flux produced by the semihard magnetic members 15, 16 as soon as the pulse conduction to the coils is finished. Accordingly, in pulse conduction thereafter, only an attraction force produced by this pulse conduction is applied to the movable member 2, and thus it is possible to greatly improve the accuracy of the stop position of the movable member 2 without causing any hysteresis in the step position thereof.

Figure 3:
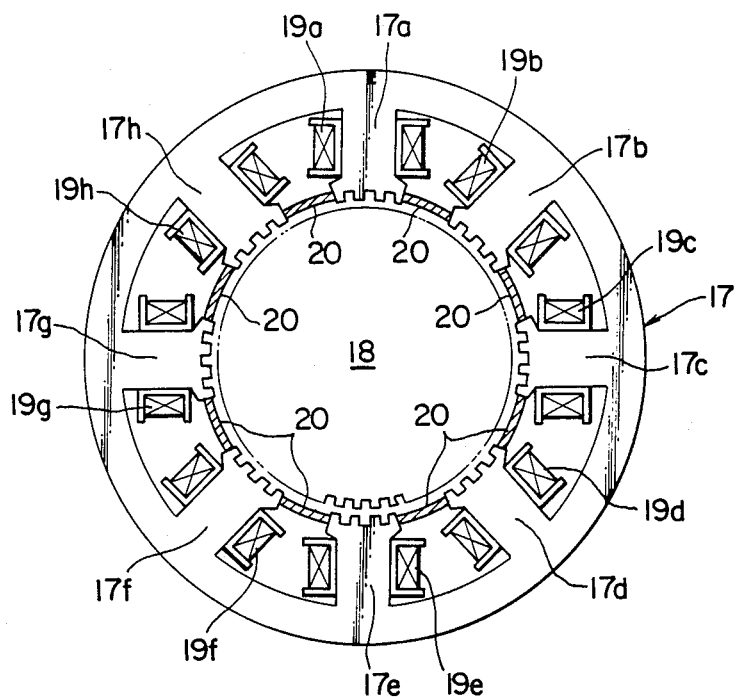
FIG. 3 is a cross-sectional view illustrating a second embodiment of a stepping motor and a method of driving such a pulse motor according to the present invention.

Moreover, a second embodiment of the driving method of a stepping motor according to the present invention will be described. This is also applicable, without being limited to linear stepping motors of the type described above, to a rotary type stepping motor as shown in FIG. 3 (flat view).

This stepping motor includes a cylindrical stator 17 (primary side magnetic flux generator unit) having eight magnetic poles 17a to 17b projecting to the inner periphery side and a cylindrical rotor (secondary side magnetic member) 18 rotatably provided in the interior of the stator 17, wherein a pulse current is successively supplied to coils 17a to 17h mounted on the respective magnetic poles 17a to 17h to generate a magnetic flux along a magnetic flux path formed between adjacent magnetic poles for thereby rotating stepwise the rotor 18.

Rectangular semihard magnetic members 20 . . . are provided on the tip ends of the above magneitc poles 17a to 17h between the adjacent magnetic poles. The material quality of these semihard magnetic member 20 . . . is selected to be equal to that of the aforementioned first embodiment.

It is also possible in this stepping motor to sharply improve the accuracy of the stop position of the rotor by cancelling out the residual magnetic fluxes formed between the respective magnetic poles 17a to 17h and the rotor 18 by making use of the magnetic fluxes produced by the semihard magnetic members 20 . . . .

Figure 4:
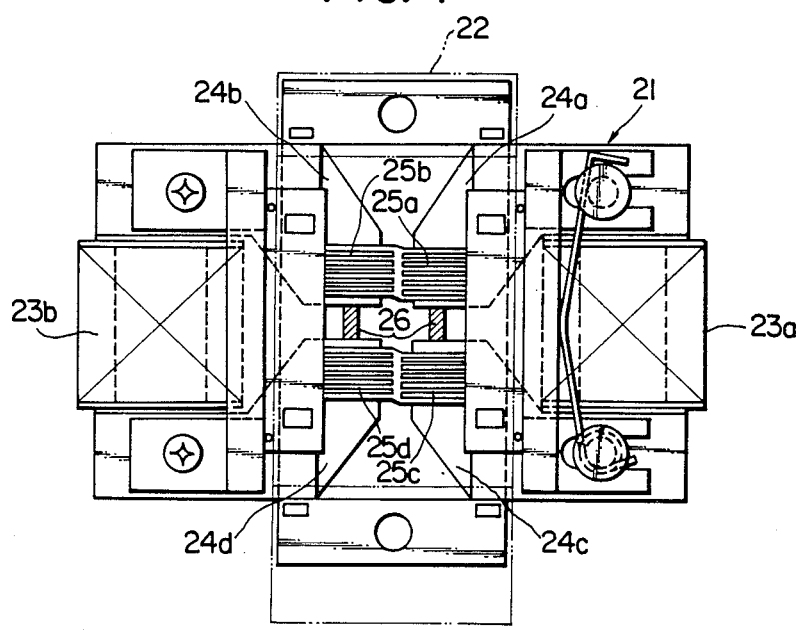
FIG. 4 is a plan view illustrating a third embodiment of a stepping motor and a method of driving such a motor according to the present invention.

In addition, a microminiature linear stepping motor being a third embodiment of the present invention will be described with reference to FIG. 4.

In the figure, designated at 21 is a stator (primary side magnetic flux generator unit) and 22 is a movable member (secondary side magnetic member).

The stator 21 includes coils 23a, 23b provided on both sides the motor, yokes 24a to 24d connected to these coils, and magnetic poles 25a to 25d each provided on the tip ends of these yokes 24a to 24d, and serves to move the movable member 22 step by step by supplying a pulse current to the coils 23a, 23b in the prescribed order. Plate-shaped semihard magnetic members 26, 26 are respectively mounted between the magnetic poles 25a and 25c and between the magnetic poles 25b and 25d, each of couples of these magnetic poles forming the same magnetic flux path, to thereby enable the residual magnetic flux formed between each of the magnetic poles 25a to 25d and the movable member 22 to be cancelled out in the same manner as in the aforementioned first and second embodiments for improving the accuracy of the stop position of the movable member 22.

Next, respective embodiments of method of driving a stepping motor according to the present invention will be described with reference to the accompanying drawings.

Figure 5:
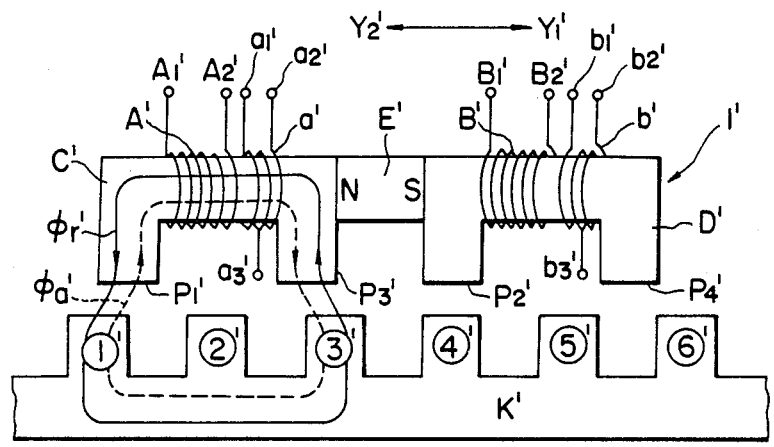
FIG. 5 is a schematical view illustrating the arrangement of a linear stepping motor according to another embodiment of the present invention.
Figure 6:
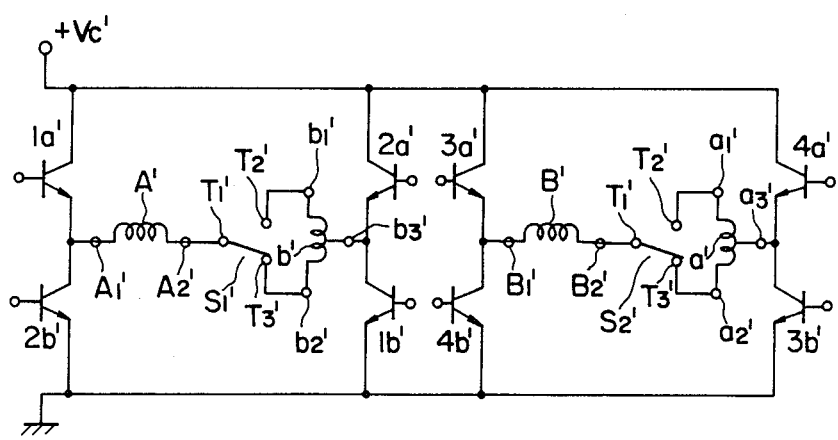
FIG. 6 is a circuit block diagram of a coil driving circuit for driving main coils A', B', a', b', of the linear motor of FIG. 5.
Figure 18A:
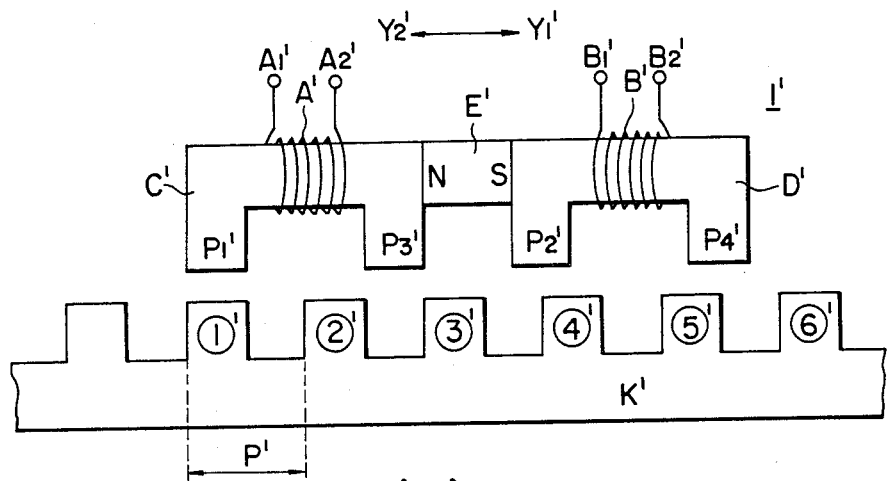
FIGS. 18(a) and 18(b) are views respectively illustrating the structure of another prior art linear stepping motor and the same motor but with a movable member moved by ¼ pitch.
Figure 18B:
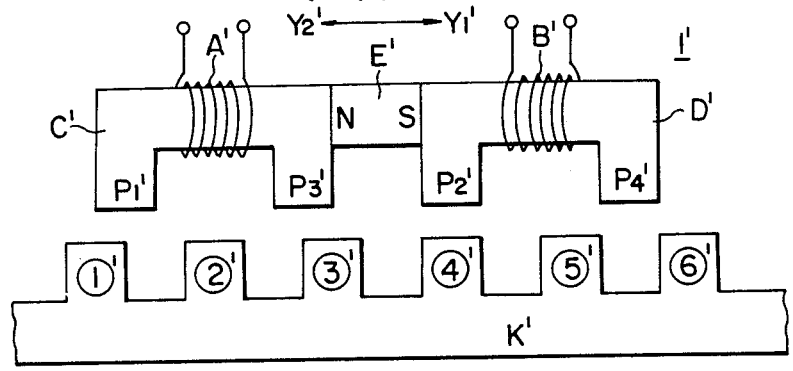
Figure 19:
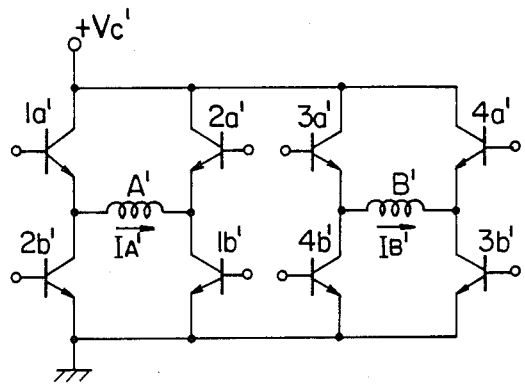
FIG. 19 is a circuit block diagram illustrating a driving circuit for the coils A', B'.
Figure 20A:
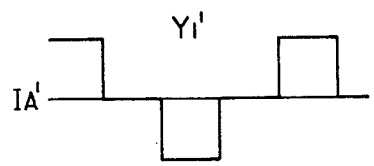
FIGS. 20(a) and 20(b) are views respectively illustrating current waveforms during prior art single-phase excitation.
Figure 20B:
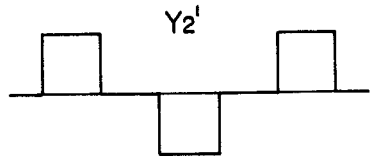
Figure 20C:
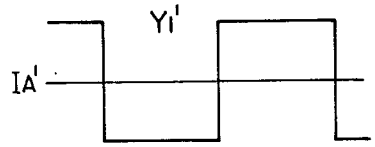
FIGS. 20(c) and 20(d) are views respectively illustrating current waveforms during prior art two-phase excitation.
Figure 20C:
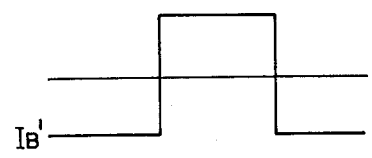
Figure 20D:
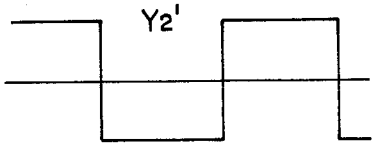
Figure 20D:
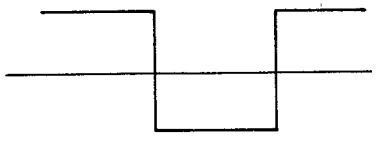
Figure 21:
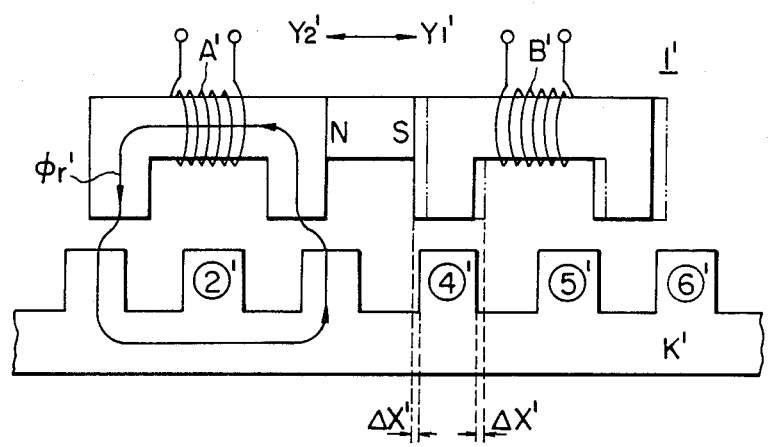
FIG. 21 is a view illustrating a positioning error in a prior art system.

Referring to FIGS. 5 and 6, a schematical view is illustrated of linear stepping motor and a driving method according to an embodiment of the present invention, together with the illustration of a circuit block diagram showing the arrangement of a coil driving circuit. In these figures, the same symbols shall be applied to those corresponding to the respective parts shown in FIG. 18(a) and FIG. 19, and the description thereof will be omitted. The driving circuit shown in FIG. 6 is a circuit for driving a coil by making use of single-phase excitation. The linear motor shown in FIG. 5 is different from that of FIG. 18 in that auxiliary coils a' and b' are respectively wound around cores C' and D' in close vicinity to main coils A' and B'. Thereupon, the numbers of turns of the auxiliary coils a', b' are respectively more greatly reduced than those of the main coils A', B', so that a magnetic flux formed in the cores C', D' by the auxiliary coils a', b' gets less than that formed by the cores A', B'. In addition, the driving circuit shown in FIG. 6 is different from the prior one shown in FIG. 19 in that one end A2' of the main coil A' is connected to the common terminal T1' of a switch S1', terminals T2', T3' of which switch S1' are respectively connected to the ends b1', b2' of the auxiliary coils b', the intermediate tap b3' of which auxiliary coil b1' is connected to the node of transistors 2a' and 1b', while likewise one end B2' of the main coil B' is connected to the common terminal T1' of a switch S2', terminals T2', T3' of which switch S2' are respectively connected to the ends a1' and a2' of the auxiliary coil a', the intermediate tap a3' of which auxiliary coil a' is connected to the node of transistors 4a' and 3b'. Next, operation of the above linear motor will be discribed.

(1) When the movable member I' is moved in the direction of the arrow Y1':

Thereupon, the common terminal T1' of the switch S1' is previously connected to the terminal T3' thereof, while the common terminal T1' of the switch S2' previously connected to the terminal T3', and the transistors 1a', 1b' are respectively driven in the same fashion as in the aforementioned prior art linear motor.

With the transistors 1a', 1b' being switched on, a current is conducted through the main coil A' in the direction of from A1' to A2' to move the movable member I' by ¼ pitch in the arrow Y1' direction in the same fashion as the above description. Thereupon, a current is further conducted from the other end b2' of the auxiliary coil b' to the intermediate tap b3'. Then, the transistors 1a', 1b' are switched off, while transistors 3a', 3b' are switched on. With the transistors 1a', 1b' being switched off, the current flowing through the main coil A' is interrupted, and hence a magnetic flux formed in the core C' owing to the above current is cut off. However, in this occasion, residual magnetism φ'r shown in FIG. 5 is left behind in the core C'. On the other hand, with the transistors 3a', 3b' being switched on, a current is conducted through the main coil B' and a portion between the other end a2' and the intermediate tap a3' of the auxiliary coil a'. The current conducted through the main coil B' as such causes the movable member I' to be moved by ¼ pitch in the arrow Y1' direction. In addition, the above current conducted through the auxiliary coil a' causes a magnetic flux φa' shown by the broken line in FIG. 5 to be formed in the core C' to cancel out the aforementioned residual magnetism φr'. As a result, the influence of the residual magnetism φr' is eliminated, whereby the movable member I' is stopped while permitting the magnetic pole P2' and the tooth of the stator (tooth 4 ' in FIG. 5) to be located in an accurate confronting relation.

Then, with the transistors 3a', 3b' being switched off and with the transistors 2a', 2b' being switched on, currents are respectively conducted through the main coil A' and a portion between b2' and b3' of the auxiliary coil b'. Thus, the movable member I' is driven by the current conducted through the coil A' by ¼ pitch in the arrow Y1' direction, and the residual magnetism φr' in the core D' is cancelled out by the current conducted through the auxiliary coil b'. The same process is repeated thereafter, and thereby the movable member I' is moved in succession in the arrow Y1' direction.

(2) When the movable member I' is moved in the direction of the arrow Y2':

The common terminal T1' of the switch S1' is previously connected to the terminal T2' of the same, while the common terminal T1' of the switch S2' is likewise connected to the terminal T2', and the transistors 1a', 1b'... are respectively driven in the same fashion as in the aforementioned prior art linear motor. Also in this case, the movable member I' is driven in the arrow Y2' direction by the currents flowing through the main coils A' and B', and furthermore the residual magnetic fluxes φr' in the cores C', D' are cancelled out by the magnetic fluxes due to the current flowing through the auxiliary coils a', b'.

According to the embodiment of the present invention, as described above, the residual fluxes φr' produced in the cores C', D' can be cancelled out by the currents flowing through the auxiliary coils a', b'. As a result, no hysterisis due to the residual magnetic flux is produced to enable the stop position of the movable member I' to be accurately positioned. Furthermore, according to this embodiment, it is possible to move the movable member I' to a desired position even when the movable member I' does not reach the desired position, by adjusting the currents flowing through the auxiliary coils a', b'.

Figure 7:
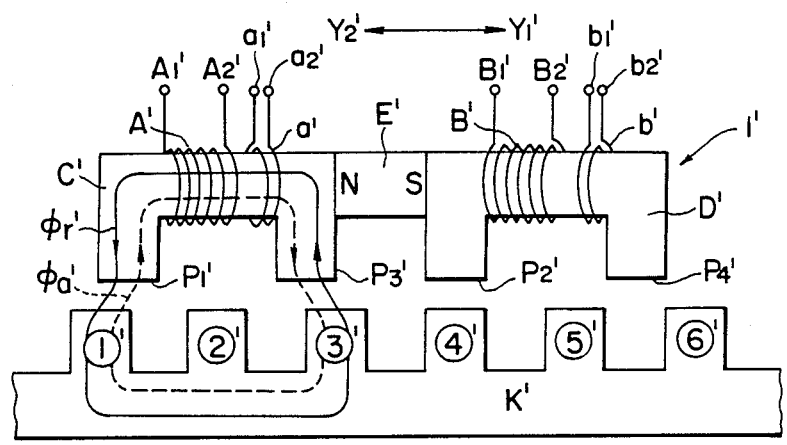
FIG. 7 is a schematical view illustrating a linear stepping motor according to still another embodiment of the present invention.
Figure 8:
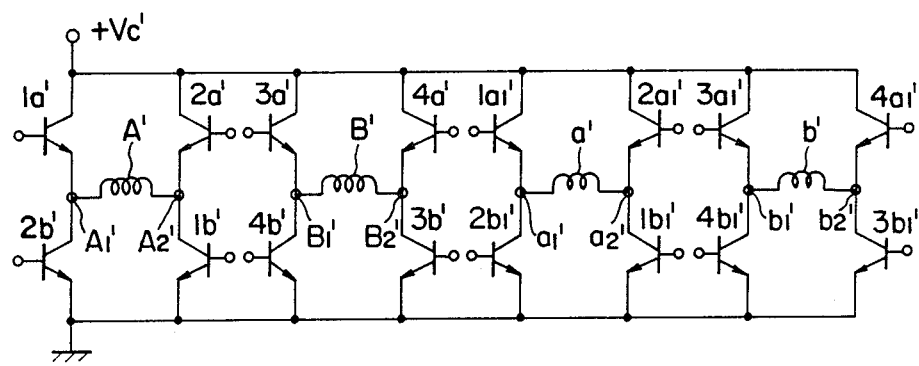
FIG. 8 is a circuit block diagram illustrating a coil driving circuit for driving coils A', B', a', b', of the linear motor of FIG. 7.

Next, another linear stepping motor and method of driving a linear stepping motor according to another embodiment of the present invention will be described with reference to FIG. 7. The linear motor shown in this figure is different from that shown in FIG. 5 in that the number of turns of the auxiliary coils a', b' are reduced and no intermediate tap is provided on the auxiliary coils a', b'. A driving circuit to drive the main coils A', B', and the auxiliary coils a', b' of the linear puse motor of FIG. 7 has a circuit block diagram illustrated in FIG. 8. Respective transistors 1a'... illustrated in the same figure are respectively driven (switched on) in the following order.

(1) When the movable member I' is moved in the arrow Y1' direction:

| 1a' | 3a' | 2a' | 4a' | 1a' |
|-----|-----|-----|-----|-----|
| 1b' → | 3b' → | 2b' → | 4b' → | 1b' →... |
| 3a1' | 2a1' | 4a1' | 1a1' | 3a1' |
| 3b'1 | 2b'1 | 4b'1 | 1b'1 | 3b'1 |

Hereupon, those transistors listed on the same column are simultaneously driven (the same shall be applied hereafter).

(2) When the movable member I' is moved in the arrow Y2' direction:

| 4a' | 2a' | 3a' | 1a' | 4a' |
|-----|-----|-----|-----|-----|
| 4b' → | 2b' → | 3b' → | 1b' → | 4b' →... |
| 2a1' | 3a1' | 1a1' | 4a1' | 2a1' |
| 2b1' | 3b1' | 1b1' | 4b1' | 2b1' |

Figure 9:
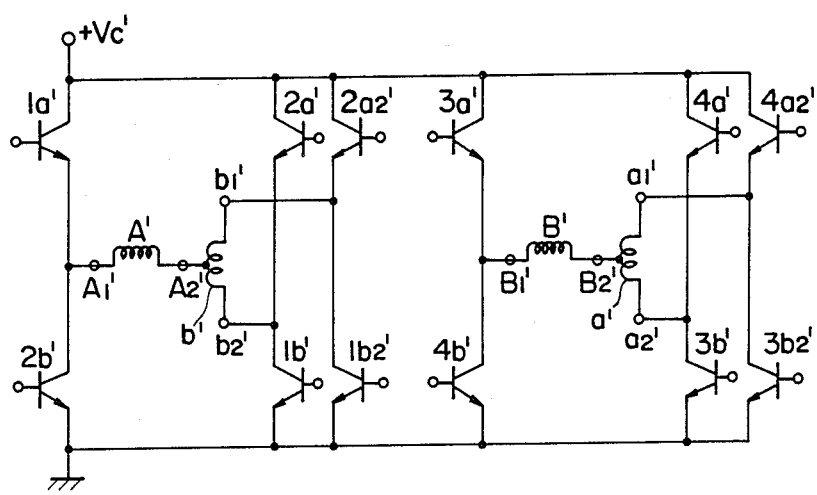
FIG. 9 is a circuit block diagram of a coil driving circuit according to another embodiment of the present invention.

Referring in succession to FIG. 9, a block diagram is provided of a coil driving circuit according to another embodiment of a method of driving a stepping motor according to the present invention. The driving circuit in this case is the same as that for respectively driving the main coils A', B' and the auxiliary coils a', b' of the linear motor shown in FIG. 5. The respective transistors 1a, ... shown in this figures are driven (switched on) in the following order.

Figure 10:
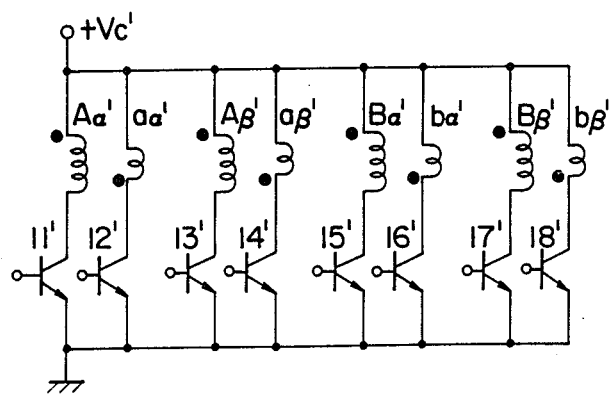
FIG. 10 is a circuit block diagram of a coil driving circuit according to still another embodiment of the present invention.

(1) When the movable member I' is moved in the direction of the arrow Y1':

$1a' \to 3a' \to 2a' \to 4a' \to 1a' \to \ldots \, 1b' \, 3b' \, 2b' \, 4b' \, 1b'$ (2) When the movable member I' is moved in the direction of the arrow Y2':

$4a_2' \to 2a_2' \to 3a_2' \to 1a_2' \to 4a_2' \to \ldots \, 4b' \, 2b' \, 3b' \, 1b' \, 4b'$ Referring here to FIG. 10, a block diagram is provided of a coil driving circuit according to another embodiment of the method of driving a stepping motor according to the present invention. In the same figure, designated at Aα', Aβ' are respectively main coils wound around the core C', aα', aβ' are respectively auxiliary coils wound around the same core C', Bα', Bβ' are respectively main coils wound around the same core D'. Hereupon, the respective couples of the main coils Aα' and Aβ', auxiliary coils aα' and aβ', main coils Bα' and Bβ', and auxiliary coils bα' and bβ' are wound in the opposite direction with each other. Accordingly, cases for example with the main coils Aα' and Aβ' being driven produce magnetic fluxes thereof in the core C' different in their directions from each other. In addition, the direction of magnetic fluxes formed by the coils Aα' and aα' are equal to each other, and the same shall be applied to the couples of the coils Aβ' and aβ', Bα' and bα', and Bβ' and bβ'. Moreover, designated at 11' to 18' are respectively transistors each for driving the coils, which are driven respectively in the following order.

(1) When the movable member I' is driven in the direction of the arrow Y1':

11', 16'→15', 14'→13' 18'→17', 12'→11', 16'→ . . .

(2) When the movable member I' is moved in the direction of the arrow Y2':

17', 14'→13', 16'→15', 12'→11', 18'→17', 14'→ . . .

Thus, the same effect as that in the aforementioned first embodiment can be assured in the other embodiments.

Figure 11:
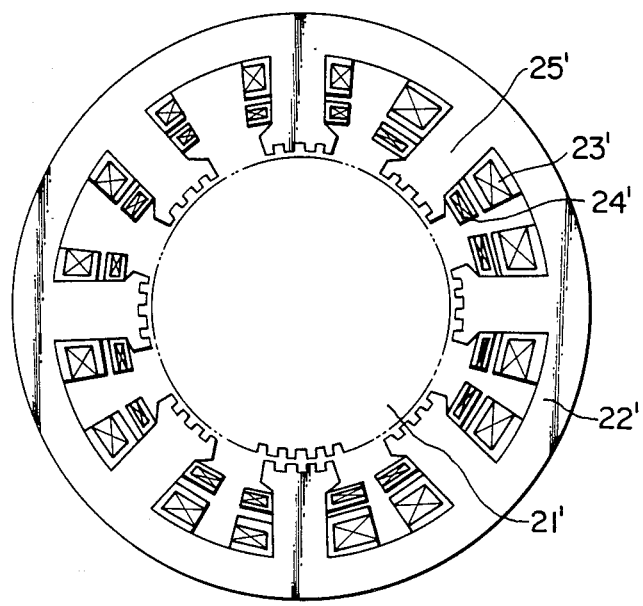
FIG. 11 is a cross-sectional view exemplarily illustrating the arrangement of a rotary stepping motor to which the present invention is applied.

In addition, although the present invention was applied to a linear motor in abovenoted embodiments, it is also applicable to rotary type stepping motors without being limited thereto. FIG. 11 illustrates a exemplary arrangement of a rotary motor to which the present second invention is applied, wherein designated at 21' is a rotor, 22' is a stator, 23' are main coils, 24' are auxiliary coils, and 25'', are electrodes. With such arrangement, a magnetic flux is generated by the auxiliary coils in the opposite direction to that generated by the main coils one step before, thereby cancelling out the residual magnetism.

Furthermore, although the aforementioned respective embodiments were with single-phase excitation, the present second invention is also useable with two-phase excitation.

Next, respective embodiments of the present invention will be described with reference to the accompanying drawings.

Figure 12:
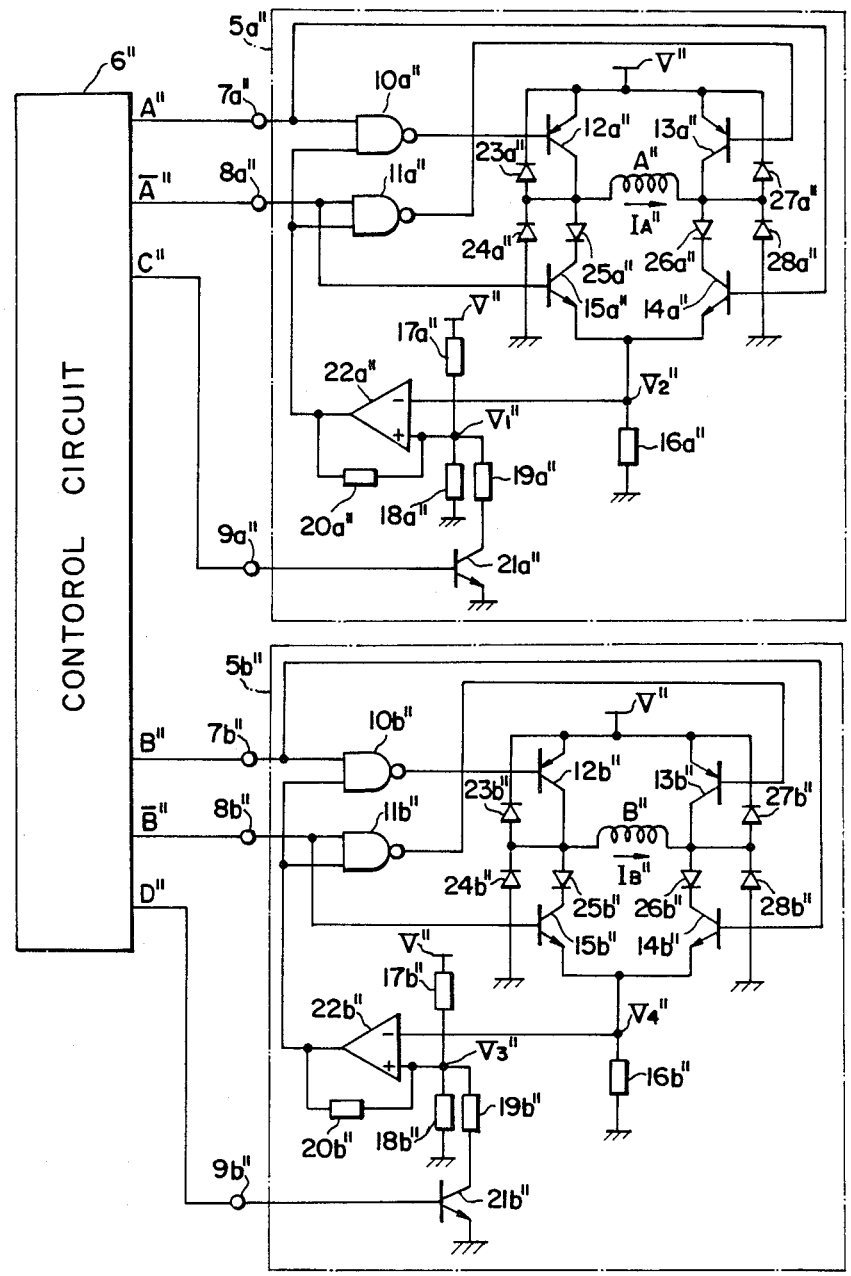
FIG. 12 is a circuit block diagram illustrating the arrangement of an embodiment of the present invention.

Referring to FIG. 12, a circuit block diagram is provided of a motor driving circuit according to an embodiment of the present invention. This driving circuit is the same circuit as the prior one for driving the coils A', B' of the linear motor shown in FIG. 18. In the same figure, designated at 5a'', 5b'' are respectively driving circuits for driving coils A'', B'', both circuits having the same arrangement. Designated at 6'' is a control circuit for supplying signals A'', $\overline{A}''$, C'', B'', $\overline{B}''$, D'' to the above driving circuits 5a'', 5b''. Designated at 7a'', 7b'', 8a'', 8b'', 9a'', 9b'' are respectively signal input terminals, 10a'', 10b'', 11a'', 11b'' are respectively two-input NAND gates, 12a'' to 15a'' and 12b'' to 15b'' are respectively transistors, A'' and B'' are respectively coils (refer to FIG. 18), and 16a'', 16b'' are respectively resistors each for detecting currents flowing through the coils A'', B''. In addition, designated at 17a'' to 19a'', 17b'' to 19b'' are respectively resistors, 20a'', 20b'' are respectively anti-oscillation resistors, and 21a'', 21b'' are respectively switching transistors for altering voltage V1'' by their on-and-off operations. Designated at 22a'' to 22b'' are respectively comparators. Likewise, 23a'' to 28a'' and 23b'' to 28b'' are respectively diodes for protecting the transistors 12a'' to 15a'' and 12b'' to 15b'' against back electromotive forces produced by the coils A'' and B''.

In the following, operation of the aforementioned driving circuit upon moving the movable member I' (refer to FIG. 18) in the Y1'' direction with single-phase excitation will be described with reference to FIG. 13(a) and FIG. 14.

Figure 13A:
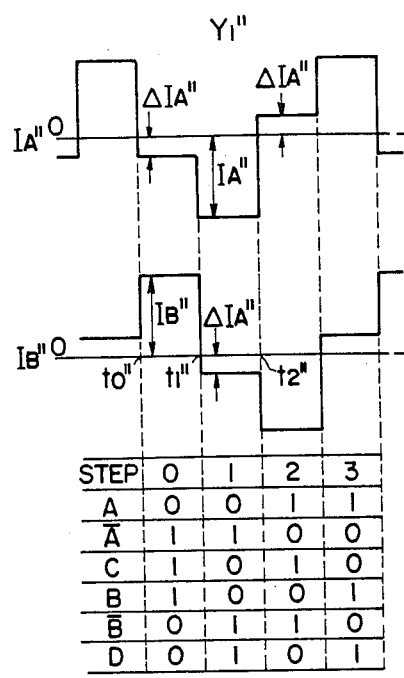
FIGS. 13(a) and is (b) are respectively views illustrating current waveforms in single-phase excitation.
Figure 13B:
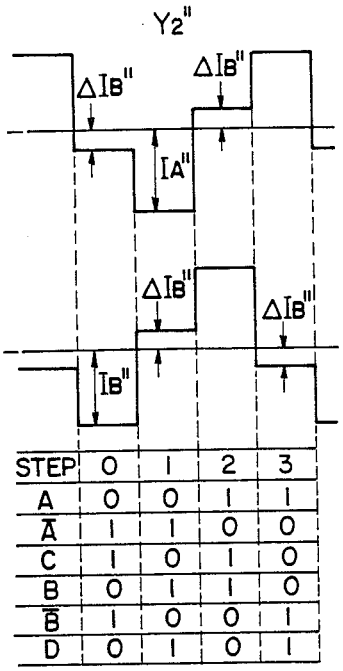
FIGS. 13(c) and 13(d) are respectively views illustrating current waveforms in two-phase excitation.
Figure 14:
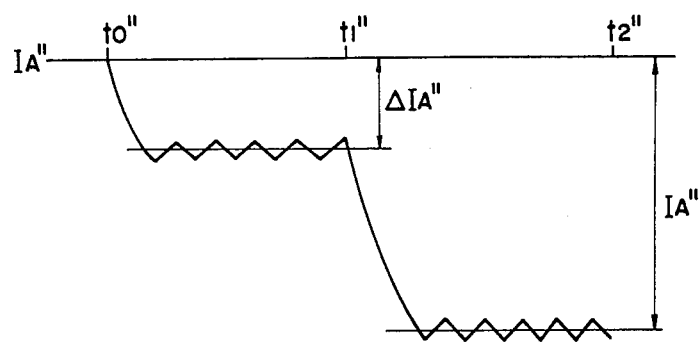
FIG. 14 is a view illustrating a current waveform flowing through a coil A" in the single-phase excitation.

A table shown in FIG. 13(a) represents output signals A'', $\overline{A}''$, C'', B'', $\overline{B}''$, D'' from the control circuit 6''. The control circuit 6'' repetitively issues respective signals in steps 0 to 3 shown in the same table in timing with a clock pulse. Moreover, waveforms illustrated in the same figure respectively show currents IA'' and IB'' each flowing through the coils A'' and B'' corresponding to the signals shown in the same table. Here, arrows indicative of the currrents IA'' and IB'' shown in FIG. 12 designate the positive direction thereof. First, the situation will be described when a step 0 signal A''="0", A''="1", C''="1" are respectively issued from the control circuit 6''. With the signal A''="0" being issued, the transistor 14a'' is switched off and an output of the NAND gate 10a'' changes to "1", whereby the transistor 12a'' is switched off. In addition, with the signal $\overline{A}''$="1" being issued, the transistor 15a'' is switched on. cLikewise, with the signal C''="1" being issued, the transistor 21a'' is switched on to permit the resistor 19a'' to be connected to the resistor 18a'' in parallel thereto, with the result that voltage V1'' on the non-inverting input end of the comparator 22a'' changes to low voltage V1L'' (e.g., 0.3 v). With the voltage V2'' satisfying V2''<V1L'', the output of the comparator 22a'' becomes "1" to make the output of the NAND gate 11a'' "0" and to thereby permit the transistor 13a'' to be switched on. When the step 0 signal is issued from the control circuit 6'' as such, the transistors 13a'', 15a'' are switched on to result in a negative current flowing through the coil A''. When the current starts to flow through the coil A'', the voltage V2'' is raised, and when it satisfies V2''>V1L'', the output of the comparator 22a'' becomes 0 to switch the transistor 13a'' off. With the transistor 13a'' so switched off, the current flowing through the coil A'' is cut off. Thus, the voltage V2'' is again lowered so as to satisfy V2''<V1L'' with the result of the output of the comparator 22a'' becoming "1", whereby a negative current is allowed to flow through the coil A'' in the same manner as the aforementioned initial state. Thereafter, a saw-toothed negative current ΔIA'' shown in FIG. 14 is allowed to flow through the coil A'' during the time interval t0''-t1'' when the operation changes to the step 1 in timing with the next clock pulse. The value of the current ΔIA'' here becomes one corresponding to the aforementioned voltage V1L''. In succession, the operation where the step 1 signals $\overline{A}''$="0", A''="1", C''="0" are respectively issued will be described. Since the signals A'' and $\overline{A}''$ are the same as those in the above step 0, the output of the NAND gate 10a'' becomes "1", with the transistors 12a'' and 14a'' being switched off and with the transistor 15a'' being switched on. In addition, when the signal C''="0" is issued, the transistor 21a'' is switched off and the one end of the resistor 19a'' is cut off, with the result that the voltage V1'' becomes V1H'' (e.g. 4.5 v). With the voltage V1'' so becoming high level V1H'', the voltage V2'' is changed so as to satisfy V2''>V1H'' to result in the output of the comparator 22a'' becoming "1", and hence the output of the NAND gate 11a'' becomes "0" to switch the transistor 13a'' on. With the step 1 signal being isssued from the control circuit 7'' as such, the transistors 13a'', 15a'' are switched off to a negative current to start to flow through the coil A''. The negative current so starting to flow through the coil A'', the voltage V2'' is raised, and when it satisfies V''2>V1H'', the output of the comparator 22a'' becomes "0" to make the output of the NAND gate 11a'' "0" and to thereby switch the transistor 13a'' off. The current flowing through the coil A'' is hereby cut off. Thus, the voltage V''2 is again lowered so as to satisfy V2''<V''1H, whereby the output of the comparator 22a'' becomes "1" to permit a negative current to flow through the coil A'' in the same manner as in the aforementioned initial state. Thereafter, a negative current IA'' shown in FIG. 14 is allowed to flow through the coil A'' during the time interval t1''-t2'' when the operation is transferred to the step 2 in timing with the next clock pulse. The value of the current IA''0 becomes here one corresponding to the voltage V1H''. The above description is for the circuit operation about the step 1, which is different from that about step 0 in that the voltage V1'' is changed depending on the transistor 21a'' being switched on and off, and a voltage difference between the voltage V1L'' yielded when the transistor 21a'' is switched on and the voltage V1H'' yielded when the same is switched off (V1H''>V1L'') provides a current difference between the corresponding currents flowing through the coil A''. Thereafter, in the step 2, in the same manner in the steps 0 and 1, the values of the signals A'' and $\overline{A}''$ in the step 0 is merely reversed when the signals A''="1", A''="0", and C''="1" are respectively issued from the control circuit 7''. Analyzing in succession the circuit operation from the signal A'' in the same procedure, the transistor 14a'' is switched on with the transistors 13a'', 15a'' being switched on and with the transistor 21a'' being switched on, and if the voltage v2'' satisfies V2''<V1L'', the transistor 12a'' is switched on to permit a positive current to start to flow through the coil A''. In addition, with the current so starting to flow through the coil A'', the voltage V2'' gets to satisfy V2''>V1L'' to result in no current flowing through the coil A''. Hereafter, a saw-toothed positive current ΔIA flows through the coil A'' till the next step. Then, in the step 3, the values of the signals A'' and $\overline{A}''$ are merely reversed with respect to those in the step 1 as is the case in the step 2, and a saw-toothed positive current ΔIA'' flows til the next step (the operation returns to the step 0). The circuit operation in the driving circuit 5a'' from the step 0 to the step 3 described above is the same also in the driving circuit 5b''. In addition, a case with the movable member I'' being moved in the Y2'' direction as shown in FIG. 13(a) can also be realized by supplying signals listed in the same figure from the control circuit 6'' to the driving circuits 5a'', 5b''.

Figure 15:
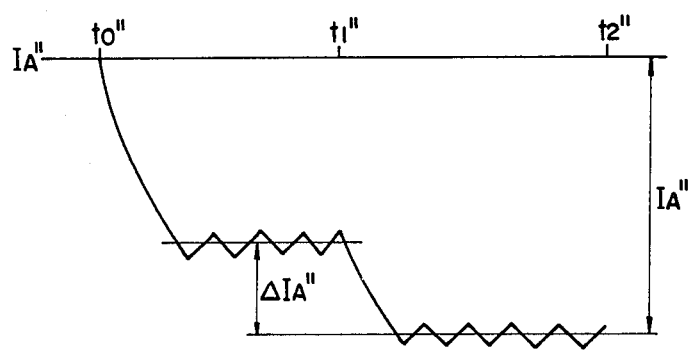
FIG. 15 is a view illustrating the waveform of a current flowing through the coil A" in the two-phase excitation.
Figure 16:
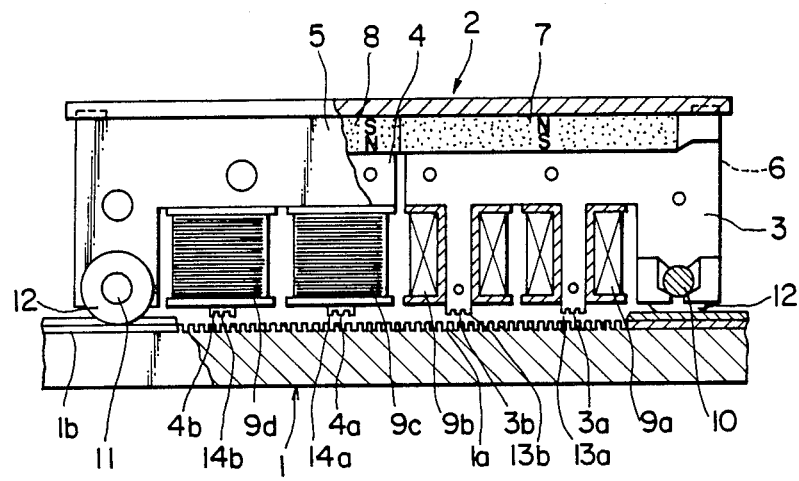
FIG. 16 is a side elevational view fractured in part illustrating a prior art linear stepping motor.
Figure 17:
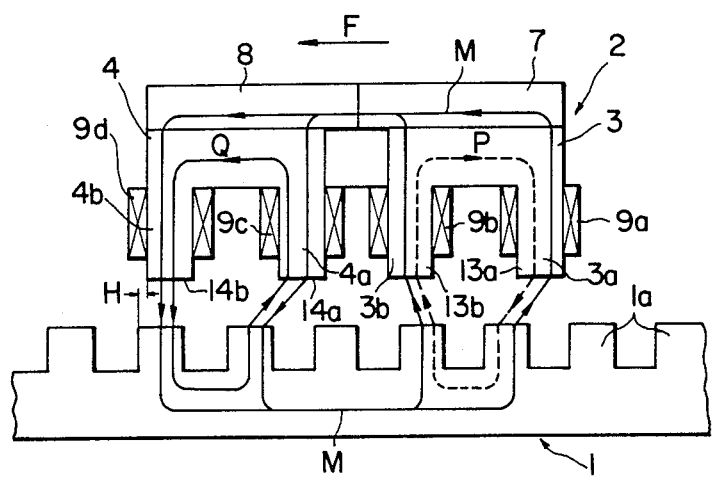
FIG. 17 is a schematical view illustrating problems of a prior art stepping motor.

Next, circuit operation in the two-phase excitation will be described based on the operation in the above-noted single-phase excitation with reference to FIGS. 13(c), (d) and FIG. 15.

Figure 13C:
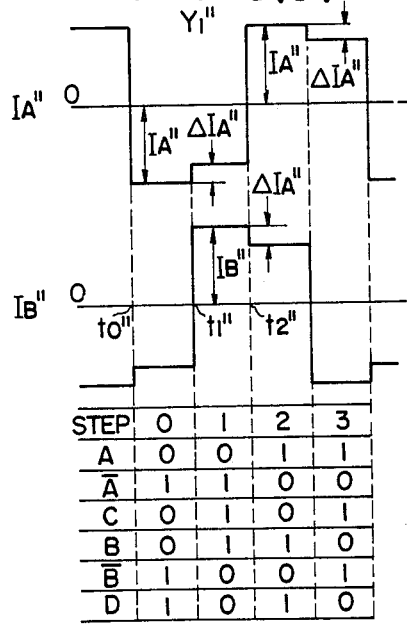
Figure 13D:
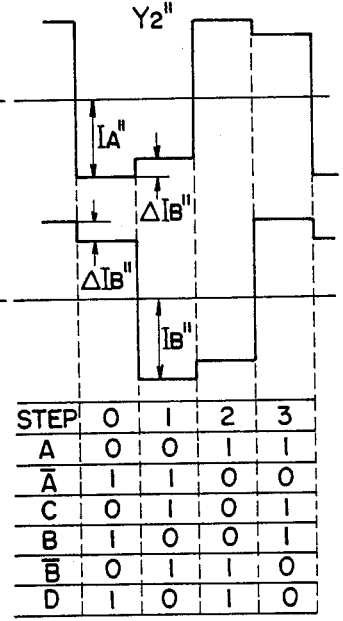

A table and waveforms shown in FIG. 13(c) are as described in the aforementioned single-phase excitation, and the circuit operation when signals in the respective steps in the same table are supplied from the control circuit 6'' to the driving circuit is also the same as that in the single-phase excitation. However, in the two-phase excitation, currents respectively alternately flow through the coils A'', B'' at all times, and hence with these current through the coils being reversed, the magnetomotive force after the reversal is reduced because of the back magnetomotive force produced by the residual magnetism reacting with the reversed core current, the residual magnetism being produced before the current reversal. To solve this, the currents flowing through the coils in the driving circuit shown in FIG. 12 may be reduced before the reversal thereof. Provided for this, the voltage V1'' in the same figure until the transistor 21a'' is switched on (t0-t1 in FIG. 15) is made higher (e.g., 4.2 v) than that in the single-phase excitation by increasing the value of the resistance 19a'', currents reduced by ΔIA'' are yielded as shown in FIGS. 13(c), (d). Assuming the voltage V1'' at this time to be V1''=V1M'', a relation V1L''<V1M''<V1H'' holds. The driving method according to the present invention can be applied to either of the single-phase excitation and the two-phase excitation by properly setting the value of the resistance 19a'' as described in the above embodiment, together with the applicability thereof to a combination of the single- and two-phase excitations.

According to the present invention, as described above, the semihard magnetic member is provided between the tip ends of magnetic poles constructing the same magnetic path among a plurality of the magnetic poles of the primary side magnetic flux generator unit, and is adapted to be magnetized every time a magnetic flux is generated in the magnetic path. Thus, a residual magnetic flux generated between each of the magnetic poles and the secondary side magnetic member can be cancelled out by a magnetic flux produced by the above magnetized semihard magnetic member, the latter magnetic flux being directed in the opposite direction to that of the above residual magnetic flux. Therefore, hysteresis can be prevented from being produced owing to the residual magnetic flux described above when the movable member (rotor) is stopped, for thereby greatly improving the accuracy to stop positioning control.

In addition, according to the present invention, as described above, the auxiliary coils are respectively provided in close vicinity to the respective main coils, which are then excited so as to produce magnetic fluxes in the opposite direction as that of the magnetic fluxes produced by the main coils after the excitation of the main coils are finished. Therefore, the residual magnetism can be cancelled with a simple structure without the use of an expensive material having reduced residual magnetism and without requiring processings such as magnetic annealing, etc., for reducing residual magnetism. Thus, hysteresis of the stop positions of the movable member can be eliminated for thereby sharply improving the positioning accuracy of the stop position of the movable member.

Furthermore, according to the present invention, as described above, a positioning error due to hysteresis of the stop position of the movable member can be eliminated without modifying the structure of the motor for thereby making possible high accuracy positioning of the movable member. Moreover, the use of a core material having larger hysteresis can reduce the cost of manufacturing the motor.

Although certain preferred embodiments have been shown and described, it should be understood that many changes and modifications may be made therein without departing from the scope of the appended claims.

What is claimed is:

1. A stepping motor comprising:
   (a) a primary side magnetic flux generator unit having a plurality of magnetic poles; and
   (b) a secondary side magnetic member provided rotatably in said primary side magnetic flux generator;
   wherein said primary side magnetic flux generator unit generates a magnetic flux passing through a magnetic flux path formed by at least two of said plurality of magnetic poles and said secondary side magnetic member to produce an attraction force between said magnetic poles and said secondary side magnetic member to impart a relative movement between said primary side magnetic flux generator unit and said secondary side magnetic member;
   and wherein said magnetic poles have coils respectively provided therebetween and have a semihard magnetic member provided over tip ends thereof so as to form a magnetic flux path among a plurality of said magnetic poles;
   and wherein said semihard magnetic member is magnetized by a magnetic flux produced in said magnetic flux path every time said magnetic flux is produced;
   and wherein said semihard magnetic member produces a magnetic flux directed in the opposite direction to that of a residual magnetic flux formed between each of said magnetic poles and a secondary side magnetic member when said primary side magnetic flux generator means stops the generation of the magnetic flux, thereby cancelling said residual magnetic flux.

2. A motor according to claim 1, wherein said semihard magnetic member is bonded to end surfaces of coils wound around iron cores so as to make close contact with the side surfaces of the tip end parts of the magnetic poles.

3. A motor according to claim 1, wherein said semihard magnetic member comprises a material selected from the group consisting of: hysteresis materials and semihard magnetic materials, high-carbon steel materials, SK material, magnetic stainless, and tungsten steel.

4. A stepping motor and driving circuit therefor, said stepping motor comprising:
   (a) a stator;
   (b) a movable member;
   (c) a plurality of main coils wound around said stator for relatively moving said stator and said movable member by allowing said main coils to be excited in succession; and
   (d) auxiliary coils provided in the vicinity of said respective main coils;
   said auxiliary coils being excited after said main coils have been excited so as to generate a magnetic flux oppositely to a magnetic flux produced by said main coils.

5. A motor and driving circuit according to claim 4, wherein said driving circuit includes a circuit for exciting said auxiliary coils, said circuit comprising: a power source means for supplying power to the driving circuit; first transistors connected between said power source and the main coils for driving the main coil; second transistors for driving said auxiliary coils, and switches connected between said main coils and said auxiliary coils for switching the directions of the currents flowing through said auxiliary coils for thereby changing the moving direction of said movable member.

6. A motor and driving circuit according to claim 4, wherein said driving circuit includes a second driving circuit comprising:
   (a) a control circuit for supplying timing signals to control energization of said coils for cancellation of residual magnetism, and
   (b) first and second driving units connected to said control circuit for driving said coils and controlling the energization thereof while receiving said timing signals.

7. A method for driving a stepping motor, said motor including a primary side magnetic flux generator unit having a plurality of magnetic poles and a plurality of secondary side magnetic members, said primary side magnetic flux generator unit generating a magnetic flux passing through a magnetic flux path formed by at least two of said magnetic poles and said secondary side magnetic member to produce an attraction force between said magnetic pole and said secondary side magnetic member for thereby moving any of said primary side magnetic flux generator units and said secondary side magnetic members, said driving method comprising the steps of:
- (a) providing a semihard magnetic member over tip ends of magnetic poles forming the same magnetic flux path among a plurality of said magnetic poles of said primary side magnetic flux generator means;
- (b) magnetizing said semihard magnetic member by a magnetic flux produced in said magnetic flux path every time said magnetic flux is produced;

wherein said semihard magnetic member produces a magnetic flux directed in the opposite direction to that of a residual magnetic flux formed between each of said magnetic poles and a secondary side magnetic member when said primary side magnetic flux generator means stops the generation of the magnetic flux, thereby cancelling said residual magnetic flux.

8. A method for driving a stepping motor, said motor including a primary side magnetic flux generator unit having a plurality of magnetic poles and a plurality of secondary side magnetic members, said semihard magnetic member being bonded to end surfaces of coils wound around iron cores so as to make close contact with the side surfaces of the tip end parts of the magnetic poles, said primary side magnetic flux generator unit generating a magnetic flux passing through a magnetic flux path formed by at least two of said magnetic poles and said secondary side magnetic member to produce attraction force between said magnetic pole and said secondary side magnetic member for thereby moving any of said primary side magnetic flux generator units and said secondary side magnetic members, said driving method comprising the steps of:
- (a) providing a semihard magnetic member over tip ends of magnetic poles forming the same magnetic flux path among a plurality of said magnetic poles of said primary side magnetic flux generator means;
- (b) magnetizing said semihard magnetic member by a magnetic flux produced in said magnetic flux path every time said magnetic flux is produced;

wherein said semihard magnetic member produces a magnetic flux directed in the opposite direction to that of a residual magnetic flux formed between each of said magnetic poles and a secondary side magnetic member when said primary side magnetic flux generator means stops the generation of the magnetic flux, thereby cancelling said residual magnetic flux.

9. A method for driving a stepping motor, said motor including a primary side magnetic flux generator unit having a plurality of magnetic poles and a plurality of secondary side magnetic members, said semihard magnetic member being bonded to end surfaces of coils wound around iron cores so as to make close contact with the side surfaces of the tip end parts of the magnetic poles and said semihard magnetic member comprises a material which is selected from the group consisting of hysteresis materials and semihard magnetic materials, high-carbon steel materials, SK material, magnetic stainless steel and tungsten steel, said primary side magnetic flux generator unit generating a magnetic flux passing through a magnetic flux path formed by at least two of said magnetic poles and said secondary side magnetic member to produce attraction force between said magnetic pole and said secondary side magnetic member for thereby moving any of said primary side magnetic flux generator units and said secondary side magnetic members, said driving method comprising the steps of:
- (a) providing a semihard magnetic member over tip ends of magnetic poles forming the same magnetic flux path among a plurality of said magnetic poles of said primary side magnetic flux generator means;
- (b) magnetizing said semihard magnetic member by a magnetic flux produced in said magnetic flux path every time said magnetic flux is produced;

wherein said semihard magnetic member produces a magnetic flux directed in the opposite direction to that of a residual magnetic flux formed between each of said magnetic poles and a secondary side magnetic member when said primary side magnetic flux generator means stops the generation of the magnetic flux, thereby cancelling said residual magnetic flux.

10. A method of driving a stepping motor, said motor including a stator, a movable member, and a plurality of main coils wound around said stator for relatively moving said stator and said movable member by allowing said main coils to be excited in succession, said driving method comprising the steps of:
- (a) providing auxiliary coils in the vicinity of said respective main coils; and
- (b) exciting said auxiliary coils after said main coils have been excited so as to generate a magnetic flux oppositely to a magnetic flux produced by said main coils.

11. A method of driving a stepping motor, said motor including a stator, a movable member, and a plurality of main coils wound around said stator for relatively moving said stator and said movable member by allowing said main coils to be excited in succession, said driving method comprising the steps of:
- (a) providing auxiliary coils in the vicinity of said respective main coils, wherein the number of turns of said auxiliary coils is sufficiently less than that of said main coils; and
- (b) exciting said auxiliary coils after said main coils have been excited so as to generate a magnetic flux oppositely to a magnetic flux produced by said main coils.

12. A method of driving a stepping motor with a driving circuit, said motor including a stator, a movable member, and a plurality of main coils wound around said stator for relatively moving said stator and said movable member by allowing said main coils to be excited in succession, and wherein said driving circuit comprises: a power source means for supplying power to the driving circuit; first transistors connected between said power source and said main coils for driving said main coils; second transistors for driving auxiliary coils; and switches connected between said main coils and said auxiliary coils for switching the directions of the currents flowing through said auxiliary coils for thereby changing the moving direction of said movable member, said driving method comprising the steps of:
providing said auxiliary coils in the vicinity of said respective main coils; and
exciting said auxiliary coils after said main coils have been excited so as to generate a magnetic flux oppositely to a magnetic flux produced by said main coils.

* * * * *